J. E. WHITT.
SPRING WHEEL.
APPLICATION FILED DEC. 18, 1914.
1,142,649.
Patented June 8, 1915.
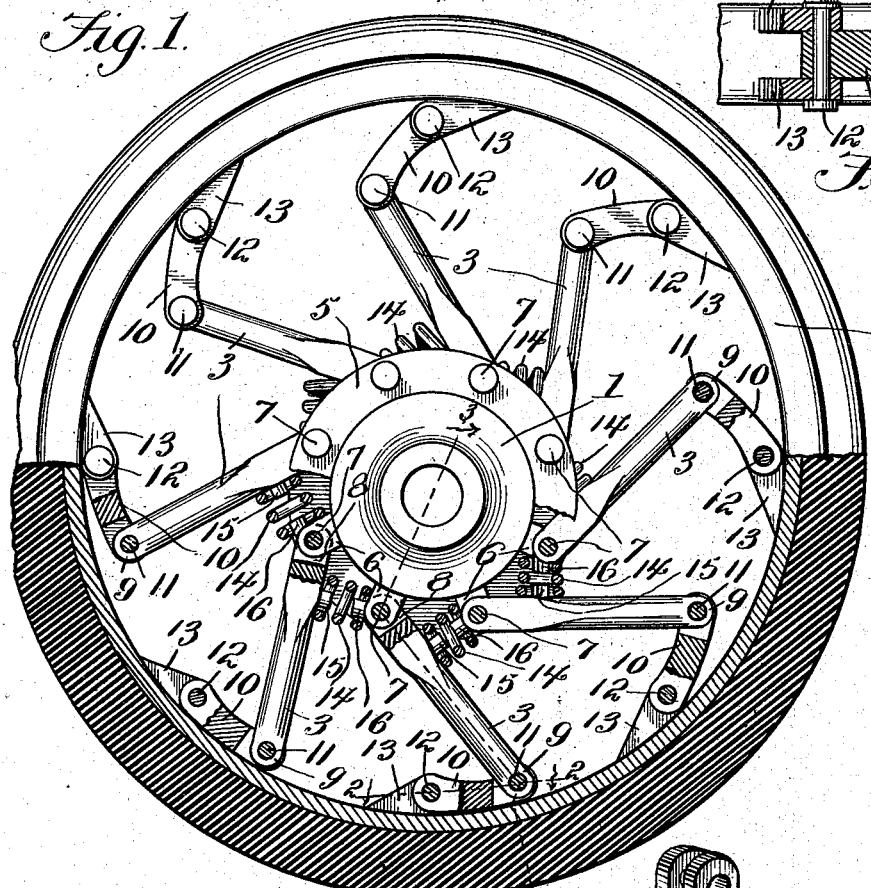
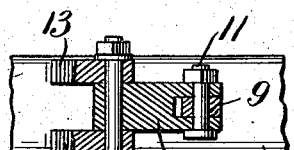
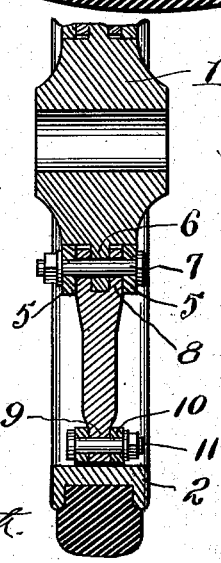
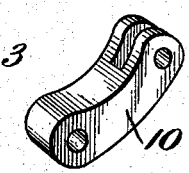
Inventor
J. E. Whitt
By Victor J. Evans
Attorney

UNITED STATES PATENT OFFICE.

JAMES E. WHITT, OF CHAMPAIGN, ILLINOIS.

SPRING-WHEEL.

1,142,649.

Specification of Letters Patent.

Patented June 8, 1915.

Application filed December 18, 1914. Serial No. 877,933.

*To all whom it may concern:*

Be it known that I, JAMES E. WHITT, a citizen of the United States, residing at Champaign, in the county of Champaign and State of Illinois, have invented new and useful Improvements in Spring-Wheels, of which the following is a specification.

This invention relates to spring wheels, the object in view being to produce a wheel adapted to be equipped with a solid tire of rubber or other suitable material, the wheel embodying in its construction novel means for absorbing all ordinary road shocks and vibrations and preventing the same from being communicated to the axles and body of the vehicle in connection with which the wheel is employed. A wheel constructed in accordance with the present invention is adapted to dispense with the use of pneumatic tires and the troubles incident to the use thereof.

With the above and other objects in view, the invention consists in the novel construction, combination and arrangement of parts, as herein described, illustrated and claimed.

In the accompanying drawings, Figure 1 is a side elevation partly in section of a wheel when subjected to a load, showing the relative positions of the spokes and links at the top and bottom of the wheel. Fig. 2 is a fragmentary section on the line 2—2 of Fig. 1 taken centrally and longitudinally of one link. Fig. 3 is a fragmentary section on the line 3—3 of Fig. 1 taken centrally and longitudinally of one spoke. Fig. 4 is a detail perspective view of one of the spokes. Fig. 5 is a similar view of one of the links.

The wheel contemplated in this invention comprises essentially a hub 1 and a rim 2 and spokes 3. The rim 2 is adapted to support a tire of any kind, preferably one of the solid rubber type as shown. In the preferred embodiment of this invention, the hub 1 is provided with circumferential flanges 5 and between said flanges the hub is provided with outwardly extending lugs 6 to which the inner extremities of the spokes 3 are pivotally connected by bolts 7 or the equivalent thereof, said bolts passing also through the flanges 5 and thereby obtaining a three-point support. Each spoke has its inner end bifurcated as shown at 8 to straddle the adjacent lug 6, the branches of the spoke at opposite sides of the lug being interposed between the lug and the flanges 5. This aids materially in stiffening and bracing the connection between the inner end of each spoke and the hub. Each spoke has its outer end reduced to form a tenon 9 which is received in the slotted end of a link 10 and pivotally connected thereto by means of a bolt 11 or its equivalent. The opposite end of the link 10 is pivotally mounted at 12 between a pair of oppositely arranged ears 13 extending inwardly from the rim 2. Between each spoke 3 and one of the links 6 there is interposed a coiled expansion spring 14, the spoke being provided with a projection 15 around which one end of the spring 14 fits while the lug 6 is also provided with a projection 16 around which the opposite end of the spring is placed. These lugs or shoulders serve to hold the spring in place, permitting the same to expand for the purpose of forcing the spokes 3 normally toward a position where they approach the nearest to the radius of the wheel.

It will be seen that all of the spokes 3 are arranged at an angle to the radius of the wheel and the greater the load imposed on the hub of the wheel, the greater the angle of the spokes in relation to the radius of the wheel. The springs 14 sustain the load and tend to hold the spokes 3 in such relation to the hub and rim of the wheel that the links will bear throughout their length against the inner face of the rim or felly as shown at the bottom of Fig. 1. When weight or a downward thrust is imposed on the hub of the wheel, the links at the lower portion of the wheel are held tightly against the rim while the free ends of the links adjacent to the top of the wheel are rocked away from the rim, said action being cushioned by the expansion springs 14. In this way, the hub of the wheel may yield relatively to the rim in any point in the revolution of the wheel. The springs 14 may be made as stiff as may be found necessary to support the load to which the wheel is subjected in accordance with the vehicle and its weight together with the normal load to be carried.

What I claim is:—

1. In a spring wheel, the combination of a hub having shoulders, a rim, spokes having a jointed connection with the hub, extending at an angle to the radius of the wheel, pivoted links connecting the outer extremities of said spokes with the rim, and expansion springs interposed between said spokes and the shoulders of the hub, the free ends of said links being movable into and out of contact with the rim.

2. In a spring wheel, the combination of a hub having shoulders, a rim, spokes having a jointed connection with the hub, extending at an angle to the radius of the wheel, pivoted links connecting the outer extremities of said spokes with the rim, and expansion springs interposed between said spokes and the shoulders of the hub, said links extending longitudinally of and being adapted to rest against the inner face of the rim.

In testimony whereof I affix my signature in presence of two witnesses.

JAMES E. WHITT.

Witnesses:
HAROLD HUBER,
EMMA MAHER.

Copies of this patent may be obtained for five cents each, by addressing the "Commissioner of Patents, Washington, D. C."